United States Patent
Hickey et al.

(10) Patent No.: US 7,065,556 B1
(45) Date of Patent: Jun. 20, 2006

(54) METHOD AND SYSTEM FOR LOGGING EVENT DATA AND PERSISTENTLY DOWNLOADING THE SAME

(75) Inventors: James P. Hickey, Woodland, CA (US); Zamaneh Mowzooni, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 09/661,360

(22) Filed: Sep. 14, 2000

(51) Int. Cl.
  *G06F 15/16* (2006.01)

(52) U.S. Cl. .................. 709/217; 709/224; 709/202; 714/25; 714/47

(58) Field of Classification Search ............. 709/223, 709/224, 318, 315; 370/252, 908
See application file for complete search history.

(56) References Cited

U.S. PATENT DOCUMENTS

| | | | |
|---|---|---|---|
| 5,251,152 A * | 10/1993 | Notess | 709/224 |
| 5,642,478 A * | 6/1997 | Chen et al. | 714/45 |
| 5,748,881 A * | 5/1998 | Lewis et al. | 714/47 |
| 5,802,291 A * | 9/1998 | Balick et al. | 709/202 |
| 5,935,262 A * | 8/1999 | Barrett et al. | 714/46 |
| 5,957,190 A * | 9/1999 | Morishita et al. | 164/112 |
| 5,958,010 A * | 9/1999 | Agarwal et al. | 709/224 |
| 5,958,049 A * | 9/1999 | Mealey et al. | 713/1 |
| 5,969,705 A * | 10/1999 | Fisher et al. | 345/764 |
| 6,199,180 B1 * | 3/2001 | Ote et al. | 714/31 |
| 6,260,062 B1 * | 7/2001 | Davis et al. | 709/223 |
| 6,470,388 B1 * | 10/2002 | Niemi et al. | 709/224 |
| 6,505,245 B1 * | 1/2003 | North et al. | 709/223 |
| 6,715,097 B1 * | 3/2004 | Kidder et al. | 714/2 |
| 2005/0165929 A1 * | 7/2005 | Motoyama | 709/224 |

* cited by examiner

*Primary Examiner*—Wen-Tai Lin

(57) ABSTRACT

A method and system for logging event data from at least one operable application program or at least one peripheral device operably connected to a server using a log manager device driver. The method includes the steps of registering the log manager device driver with the server to receive all the event data from the server, registering the log manager device driver with the server as a log manager file, the log manager device driver receiving the event data, and the log manager device driver responding to a download request for said log manager file from a requesting computer.

17 Claims, 4 Drawing Sheets

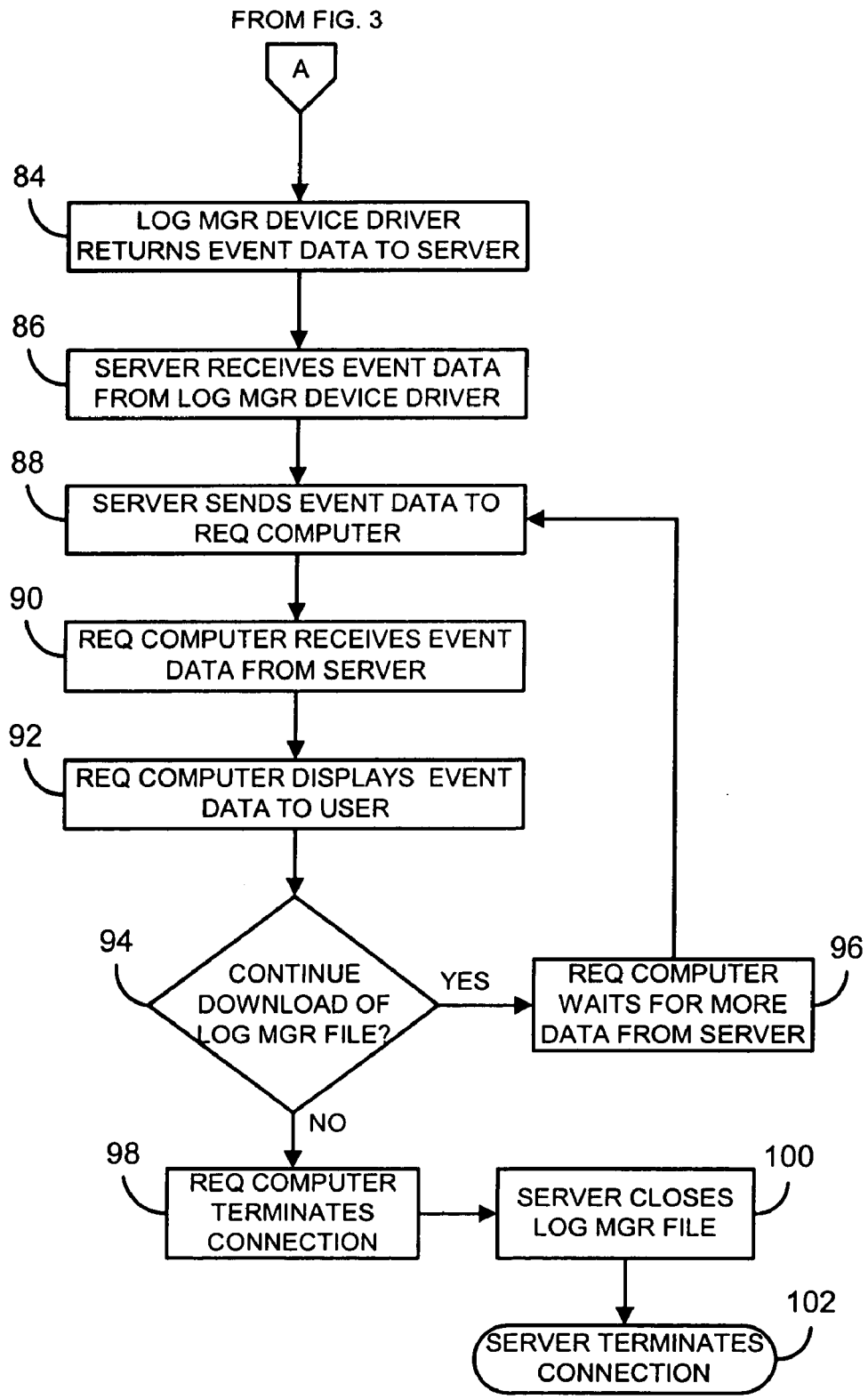

METHOD AND SYSTEM FOR LOGGING EVENT DATA AND PERSISTENTLY DOWNLOADING THE SAME

The present invention generally relates to a method and system for logging event data from at least one operable application program or at least one peripheral device operably connected to a server. More particularly, it relates to a method and system for logging event data that retrieves all the event data for the server, and can maintain a persistent connection when the event data are being downloaded to allow the server to attend to multiple requests resulting in the downloading of event data as they come in.

A computer server commonly uses a vast array of application programs and peripheral devices. Each of the application programs and the peripheral devices generally generates event data for events that occur during the operation of the computer server. Events are significant occurrences of a task or program and may relate to matters such as completions, connections, processes, terminations, status changes, errors and warnings. The event data are essential for network diagnostic and troubleshooting. The event data are often used by other application programs and peripheral devices as well.

Because of all the different connections and communications between computers that are easily available today, computer troubleshooting is no longer limited to the site of the computer. As a result, there is a need to keep a log of these event data over an extended period of time that can be easily downloaded by users of other computers. However, a typical transfer of a file involves a single request and a single response methodology. In other words, when a file is requested, the two connecting computers will generally terminate their connection once the transfer of the file is complete, which is especially true for a connection over the Internet. Since these event data change rapidly, it would be very useful to be able to keep a persistent connection for downloading the event data file. A persistent connection allows for multiple requests to be served by the server while at the same time permitting the requesting computer to continue downloading the event data as the server continues its operation and new event data comes in.

One prior method is to buffer the event data on the server, with periodic requests being made to download the event data. In this method, all the event data are stored on the server's memory, which remain until a request to download is made. Depending on the capacity of the server and the frequency of the downloading, one problem is that some of the event data may have to be discarded. As a result, valuable event data may be lost using this method. Furthermore, that implementation requires servers with significant resources in order to handle busier networks, which may be impracticable for the use of an appliance with an embedded smaller scale server, such as a Hewlett-Packard JetDirect product.

Another prior method that establishes a persistent connection through the web uses Java applets, which establish their own TCP/IP connection to the server and continuously receive the event data. However, a problem with this method is its inflexibility, because it limits the connections to computers that support Java applets. As a result, it is limited to the use of a web connection, and cannot be used with an intranet connection or a direct cable connection. Furthermore, a security certificate is required for a Java applet to establish a network connection, which may not be practical depending on the implementation.

Accordingly, a primary object of the present invention is to provide an improved method and system for logging event data that provides a persistent connection for downloading event data.

Still another object of the present invention is to provide an improved method and system for logging event data that maintains a log of event data ready for downloading.

Yet another object of the present invention is to provide an improved method and system for logging event data that is more flexible and less restrictive.

A further object of the present invention is to provide an improved method and system for logging event data that can maintain a persistent connection for downloading while allowing the server to attend to multiple requests and continue logging the event data.

SUMMARY OF THE INVENTION

The present invention generally relates to a method and system for logging event data from at least one operable application program or at least one peripheral device operably connected to a server. More particularly, it relates to a method and system for logging event data that keeps all the event data for the server and maintains a persistent connection when the event data are being downloaded while allowing the server to attend to multiple requests.

In accordance with the present invention, there is provided a method and system for logging event data from at least one operable application program or at least one peripheral device operably connected to a server using a log manager device driver. The method includes the steps of registering the log manager device driver with the server to receive all incoming event data, registering the log manager device driver with the server as a log manager file, the log manager device driver receiving the event data, and the log manager device driver responding to a download request for the log manager file from a requesting computer.

Other objects, features and advantages will become apparent upon reading the following detailed description, in conjunction with the attached drawings, in which.

DETAILED DESCRIPTION

Broadly stated, the present invention is directed to an improved method and system for logging event data in a server that receives all event data ready for downloading to another computer using a persistent connection. A log manager device driver first registers with the server to receive all incoming event data and as the device driver for a log manager file. After the registration with the server, the log manager device driver starts receiving the event data and responding to a download request for the log manager file from a requesting computer.

Figure 1:
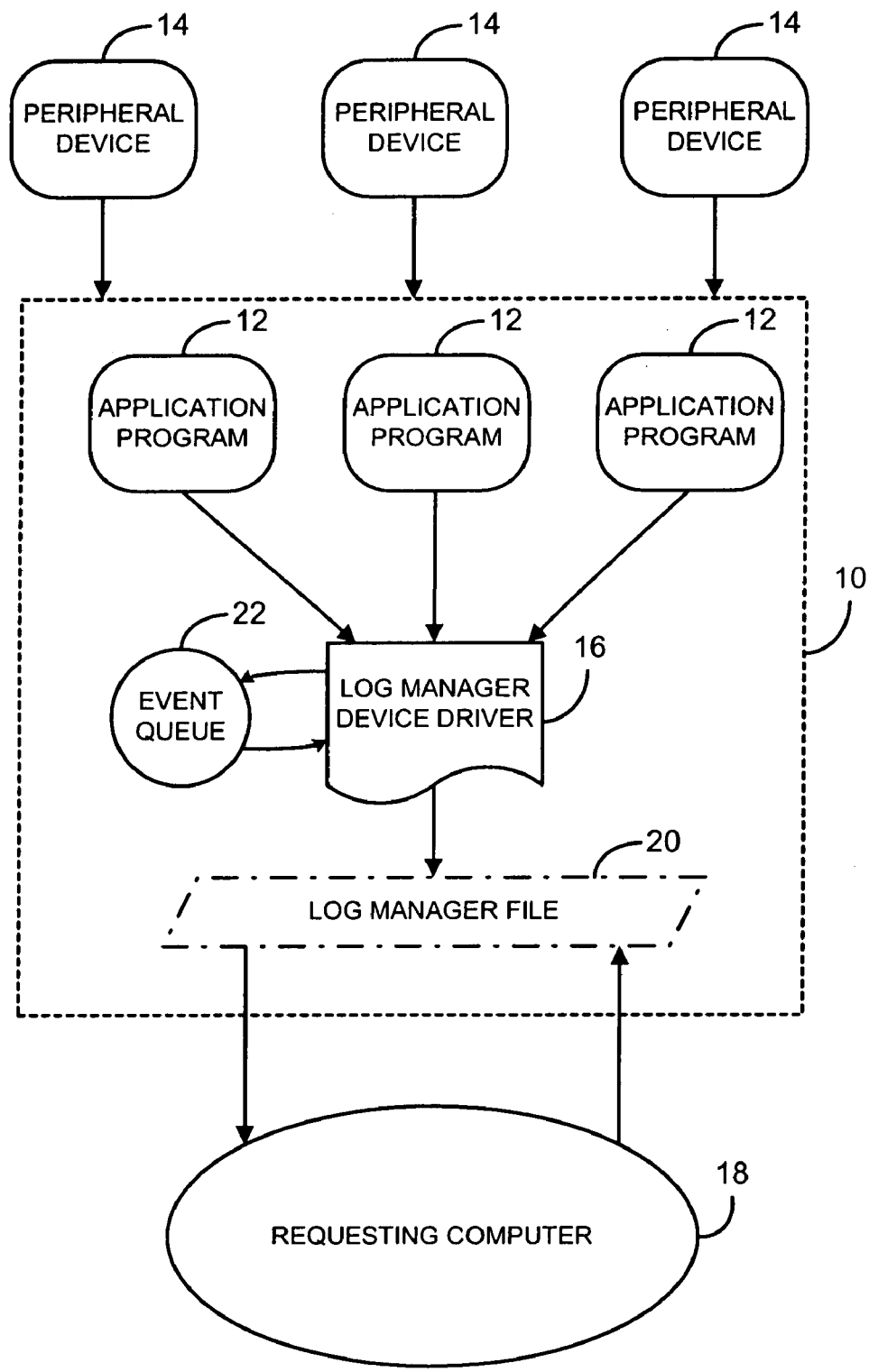
FIG. 1 is a schematic exemplary diagram of a network architecture in which the present method can be implemented.

Turning now to FIG. 1, a schematic diagram of an exemplary network architecture is shown, which illustrates one way that the network can be connected for the implementation of the present invention. As shown in FIG. 1, a server 10 is installed with at least one application program 12 (three shown) and connected to at least one peripheral device 14 (three shown). A log manager device driver 16 is preferably placed in the server along with the application program 12.

In the present invention, a requesting computer 18 seeking to download event data from the server 10 would make a request to download a log manager file 20, which is represented as a regular file and not a device driver file. Since the log manager device driver 16 had itself as the log manager file 20 at the startup, the log manager device driver would, in reality, be opened by the requesting computer 18. In practice, the server 10 and requesting computer 18 treat the connection as a download of a very large file. However, the log manager file 20 does not really exist. Rather the request of the file prompts the log manager device driver to return event data to the server, which is sent to the requesting computer as data of the log manager file.

As shown in FIG. 1, an event queue 22 is preferably implemented with the log manager device driver 16 for storing event data that has not yet been downloaded. However, the permanent storage of the event data is not necessary. For example, the present invention can be implemented to display the data as it is downloaded from the temporary memory of the server 10. In addition, the connection arrangements can be altered. As an example, a peripheral device 14 need not be connected to the server 10, and the same is true for the application program 12. These other arrangements and implementations are within the scope of the present invention.

Figure 2:
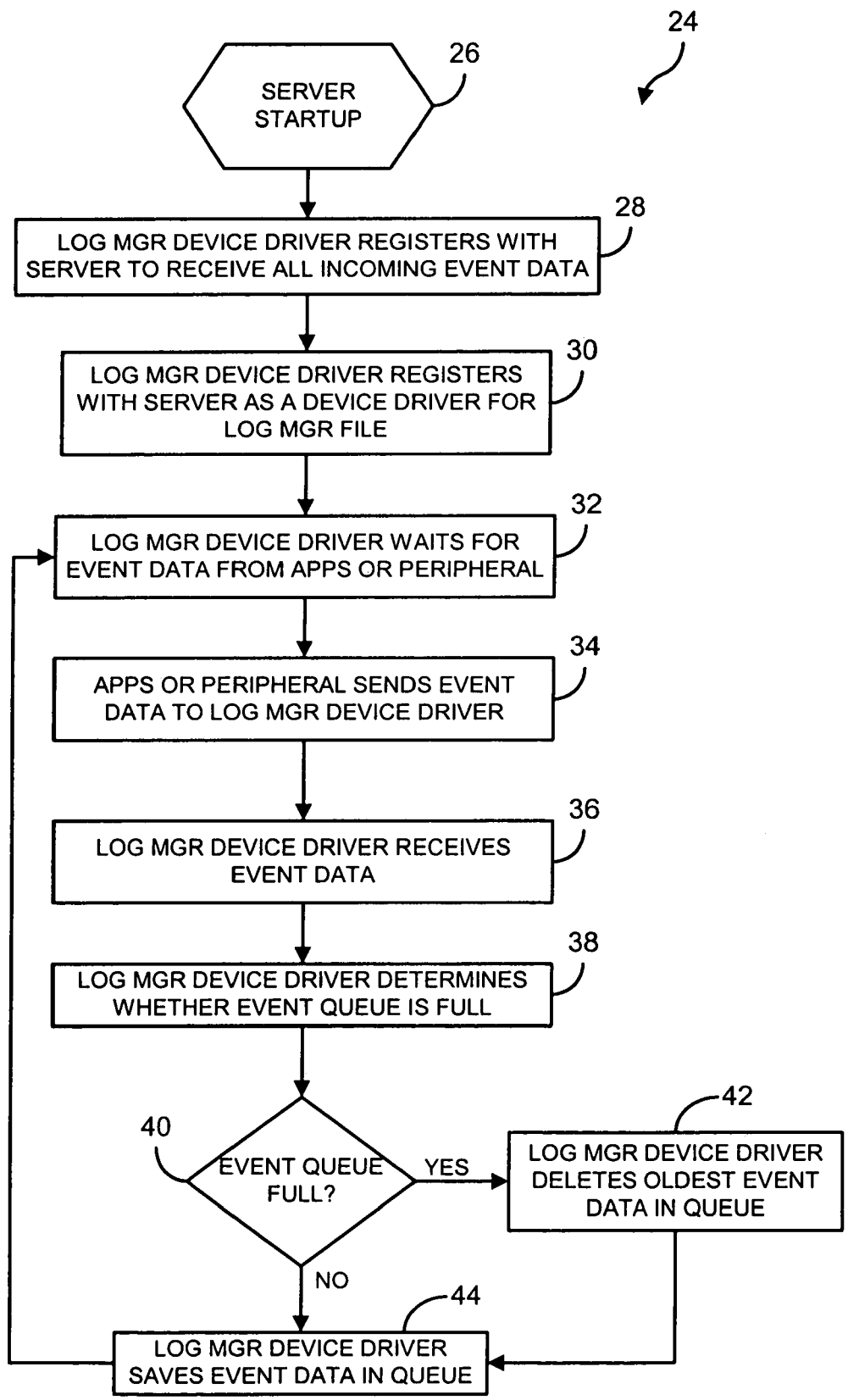
FIG. 2 is a flowchart illustrating a subroutine of the log manager device driver initializing and receiving the event data.

Turning now to FIG. 2, a flowchart showing the steps of the log manager device driver 16 initializing and receiving event data from the application program 12 or the peripheral device 14 is shown and generally indicated at 24. Device drivers comprise software that control hardware components or peripheral devices, such as a magnetic disk, magnetic tape or printer. At the startup of the computer, the device driver generally registers with the operating system as a device driver for a particular hardware component or peripheral device.

For the present invention, at the startup of the server (block 26), the log manager device driver 16 first registers with the server to receive all event data (block 28). More specifically, the operating system of the server 10 is instructed that any time an application program 12 or a peripheral device 14 requests to log an event, the event data should be sent to the log manager device driver 16. Generally, the application programs and the peripheral devices control when and what event data are sent, and the log manager device driver 16 just simply receives the event data. Next, the log manager device driver 16 registers with the server again, except this time as a device driver for the log manager file 20 (block 30).

After all the registrations are made with the server, the log manager device driver 16 then sits idle waiting for event data from the application programs 12 or the peripheral devices 14 (block 32). Once an application program 12 or a peripheral device 14 sends the event data to the log manager device driver (block 34) and the log manager device driver 16 receives the event data (block 36), the log manager device driver then determines whether the event queue is full for the newly arrived event data (block 38). If the event queue is full (block 40), the log manager device driver 18 deletes the oldest event data in the queue in order to make room (block 42) to save the newly arrived event data in the event queue (block 44). After saving the event data in the queue (block 44, the process loops back to the log manager device driver waiting for more incoming event data (block 32). The receiving event data process is done by the log manager device driver regardless of whether there is a download request initiating the downloading process. In other words, the log manager device driver receives and saves all the event data in the event queue waiting for the requesting computer 18 to download the log manager file 20 from the server 10.

Figure 3:
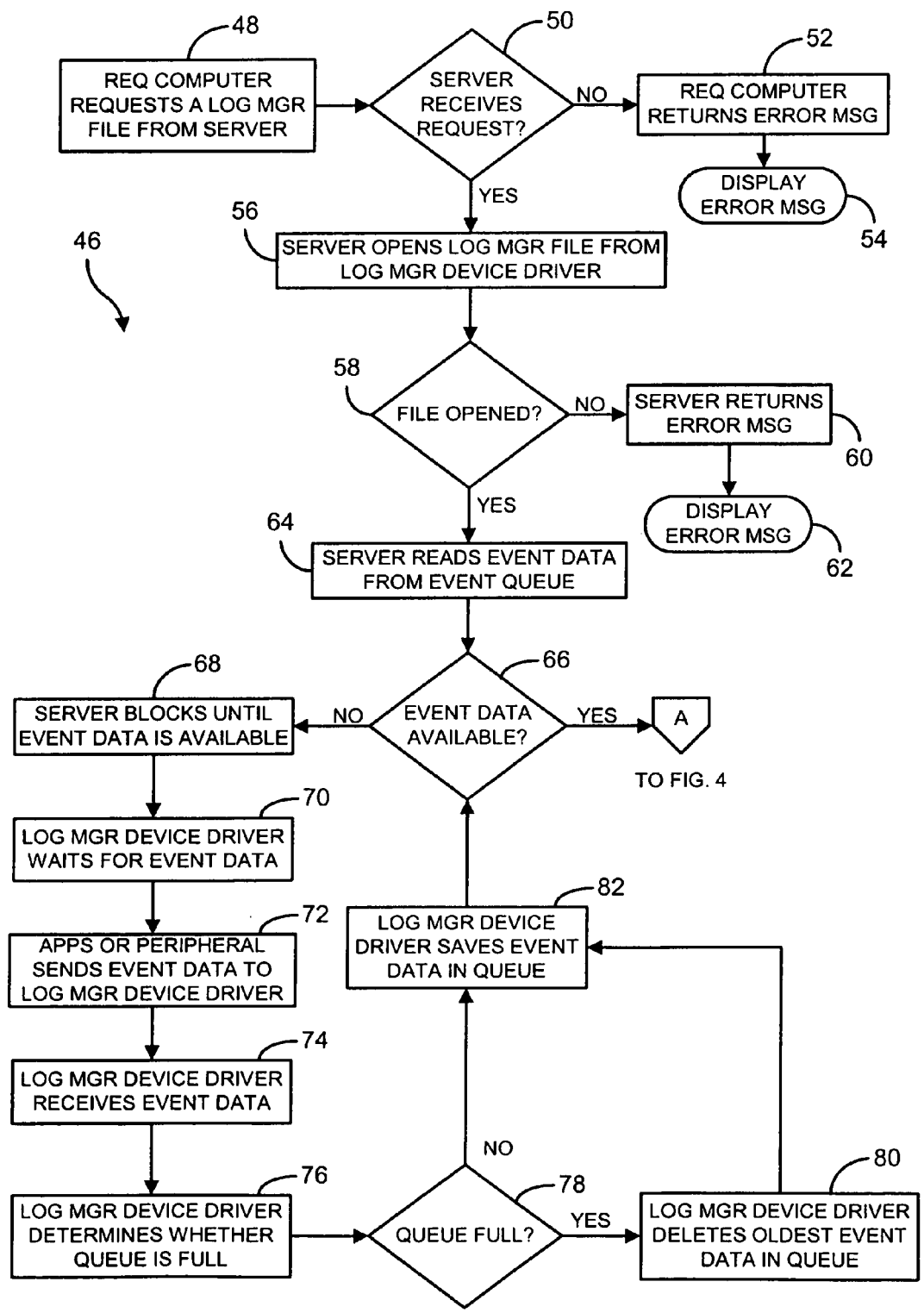
FIG. 3 is a flowchart illustrating a subroutine of the log manager responding to a download request for the event data; and, FIG. 4 is a flowchart illustrating a part of the subroutine shown in FIG. 3.

Turning now to FIGS. 3 and 4, a flowchart of the subroutine of the log manager device driver responding to a download request of the event data is shown and generally indicated at 46. To initiate this process, a requesting computer 18 must first request a log manager file from the server 10 (block 48). The requesting computer 18 then determines whether the server 10 received the request to ensure a valid connection between the requesting computer and the server (block 50). If it is determined that the server 10 did not receive the request (block 50), the requesting computer 18 will return an error message (block 52), which is preferably displayed to the user (block 54). On the other hand, if the server 10 did receive the request (block 50), the server will open the log manager file 20 from the log manager device driver 16 (block 56).

The server next determines whether the log manager file 20 is successfully opened from the log manager device driver (block 58). If the opening of the file proves to be unsuccessful (block 58), the server 10 will return an error message to the requesting computer 18 (block 60), which is again preferably displayed to the user (block 62). If, however, the file is opened successfully, the server reads the event data from the event queue (block 64), and determines whether there are any event data available (block 66).

If the event queue does not have any event data available (block 66), the server blocks, meaning it stays idle and waits, until event data are available in the event queue (block 68). Similarly, the log manager device driver also stays idle and waits for the event data (block 70). When event data are sent from the application program 12 or the peripheral device 14 (block 72), the log manager device driver 16 receives the event data (block 74) and determines whether the event queue is full (block 76). If the queue is full (block 78), the oldest event data in the queue will be deleted to make available space for the newly arrived event data (block 80). Once the event queue 22 has the available space in the event queue (block 78), the log manager device driver 16 saves the event data in the queue (block 82).

Now that event data is available (block 66), FIG. 4 shows the remaining steps of the subroutine from FIG. 3. Referring now to FIG. 4, since event data is available in the queue, the log manager device driver returns the event data in the queue to the server (block 84). The server receives the event data (block 86), and sends it to the requesting computer (block 88). The requesting computer receives the event data from the server (block 90), and preferably displays it to the user immediately or at some point (block 92).

It is next determined if the requesting computer wishes to continue downloading the log manager file (block 94). Since the log manager file 20 does not technically exit, in practice the log manager file is a way to maintain the connection between the server 10 and the requesting computer 18. As long as the requesting computer 18 thinks that the downloading of the log manager file 20 is not complete, the connection remains. As a result, a persistent connection is maintained between the server 10 and the requesting computer 18.

If the requesting computer 18 wishes to continue downloading the log manager file 20 (block 94), the requesting computer waits for more event data from the server 10 (block 96), and loops the process when the server sends more event data to the requesting computer (block 88). Because the requesting computer thinks that the log manager file is a very large file and the download is incomplete, the connection terminates only when the users choose to end the connection, meaning the computers themselves cannot automatically end the download process. If a user does choose to discontinue downloading the log manager file (block 94), the requesting computer 18 will terminate the connection to the server 10 (block 98). The server will then close the log manager file (block 100), and disconnect from the requesting computer as well (block 102).

From the foregoing description, it should be understood that an improved method and system for logging event data has been shown and described which have many desirable attributes and advantages. The method and system allow logging all the event data for a server, which is ready for downloading using a persistent connection. As a result, a more flexible and less restrictive method and system is provided, since the server is able to attend to multiple requests and continue logging the event data during the download process. A user will be able to view the event data as they are created.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for logging event data from at least one operable application program resident on a plurality of computers or at least one peripheral device operatively connected in a network to a server using a log manager device driver, the logged event data comprising a log manager file having events of the type which relate to completions, connections, processes, terminations, status changes, errors and warnings that can be used to perform network diagnostics and troubleshooting, said method comprising the steps of:

registering said log manager device driver with said server to receive all incoming event data from the computers or at least one peripheral device;

registering said log manager device driver with said server as a device driver for said log manager file;

receiving said event data by said log manager device driver; and, responding to a download request for said log manager file from any requesting one of said plurality of computers by said log manager device driver so that said requesting computer can persistently receive the event data as the server continues its operation and new data comes in, wherein the connection is terminated only by closing the log manager file.

2. The method according to claim 1 wherein prior to said receiving step further comprising the steps of:

waiting for event data from said at least one application program or said at least one peripheral device by said log manager device driver; and, sending event data to said log manager device driver by said at least one application program or said at least one peripheral device.

3. The method according to claim 1 further comprising said log manager device driver saving said event data in an event queue.

4. The method according to claim 3 wherein prior to said saving step further comprising the steps of:

determining whether said event queue is full by said log manager device driver; and, deleting an oldest event data from said event queue to make available space for new event data when said event queue is full by said log manager device driver.

5. The method according to claim 3 wherein said responding step further comprising the step of:

sending a download request for said log manager file to said server by said requesting computer;

determining whether said server received said download request by said requesting computer;

returning an error message if said server did not receive said download request by said requesting computer; and, opening said log manager file from said log manager device driver if said server received said download request by said server.

6. The method according to claim 5 wherein said returning step further comprising the step of displaying said error message to the user of said requesting computer by said requesting computer.

7. The method according to claim 5 wherein said opening step further comprising the steps of:

determining, by said server, whether said log manager file was successfully opened from said log manager device driver;

returning an error message to said requesting computer when said log manager file was not successfully opened by said server; and, reading said event data stored in said event queue when said log manager file was successfully opened by said server.

8. The method according to claim 7 wherein said returning an error message step further comprising the step of displaying said error message to the user of said requesting computer by said requesting computer.

9. A method for logging event data from at least one operable application program or at least one peripheral device operatively connected in a network to a server using a log manager device driver, the logged event data comprising a log manager file that can be used to perform network diagnostics and troubleshooting, said method comprising the steps of:

registering said log manager device driver with said server to receive all incoming event data;

registering said log manager device driver with said server as a device driver for said log manager file;

receiving said event data by said log manager device driver and saving said event data in an event queue; and, responding to a download request for said log manager file from a requesting computer by said log manager device driver so that said requesting computer can use said log manager file to perform diagnostic or troubleshooting activities said responding step further comprising the steps of:

sending a download request for said log manager file to said server by said requesting computer; determining whether said server received said download request by said requesting computer; returning an error message if said server did not receive said download request by said requesting computer; and opening said log manager file from said log manager device driver if said server received said download request by said server; said opening step further comprising the steps of: determining, by said server, whether said log manager file was successfully opened from said log manager device driver; returning an error message to said requesting computer when said log manager file was not successfully opened by said server; and reading said event data stored in said event queue when said log manager file was successfully opened by said server;

wherein said reading step further comprising the steps of:

determining whether said event data are available from said event queue by said server;

blocking until said event data are available when said event data are not available by said server;

returning said event data to server when said event data is available by said log manager device driver.

10. The method according to claim 9 wherein said blocking step further comprising the steps of:

waiting for said event data from said at least one application program or said at least one peripheral device by said log manager device driver;

sending said event data to said log manager device driver by said application program or said peripheral device;

receiving said event data by said log manager device driver; and, saving said event data in said event queue by said log manager device driver.

11. The method according to claim 10 wherein prior to said saving step, said method further comprising the steps of:

determining whether said event queue is full by said log manager device driver; and, deleting an oldest event data from said event queue to make available space for a new event data when said queue is full by said log manager device driver.

12. The method according to claim 9 wherein said returning event data step further comprising the steps of:

receiving said event data from log manager device driver by said server;

sending said event data to requesting computer by said server; and, receiving said event data from server by said requesting computer.

13. The method according to claim 12 further comprising the steps of displaying said event data to an user by said requesting computer.

14. The method according to claim 12 further comprising the steps of:

determining whether said requesting computer wants to continue downloading said log manager file by said server;

waiting for more event data from said server when said requesting computer wants to continue downloading said log manager file by said requesting computer; and, terminating the connection to said server when said requesting computer does not want to continue downloading said log manager file by said requesting computer.

15. The method according to claim 14 wherein said terminating step further comprising the steps of:

closing said log manager file by said server; and, terminating the connection to said requesting computer by said server.

16. A system for logging event data from at least one operable application program resident on a plurality of computers at least one peripheral device operatively connected to a server in a network using a log manager device driver, the logged event data comprising a log manager file having events of the type which relate to completions, connections, processes, terminations, status changes, errors and warnings that is useable for performing network diagnostics and troubleshooting, said system comprising:

means for registering with said server to receive all incoming event data from the computers or at least one peripheral device;

means for registering said with said server as a device driver for said log manager file;

means for receiving said event data; and, means for responding to a download request for said log manager file from any requesting one of said plurality of computers so that said requesting computer can persistently receive the event data as the server continues its operation and new data comes in, wherein the connection is terminated only by closing the log manager file.

17. A log manager device driver for logging event data from at least one operable application program resident on a plurality of computers or at least one peripheral device operatively connected in a network to a server, wherein the logged event data comprising a log manager file having events of the type which relate to completions, connections, processes, terminations, status changes, errors and warnings that is useable for performing network diagnostics and troubleshooting, said driver comprising:

means for registering with said server to receive all incoming event data from the computers or at least one peripheral device;

means for registering with said server as a device driver for said log manager file;

means for receiving event data; and, means for responding to a download request for said log manager file from any requesting one of said plurality of computers so that said requesting computer can persistently receive the event data as the server continues its operation and new data comes in, wherein the connection is terminated only by closing the log manager file.

* * * * *

UNITED STATES PATENT AND TRADEMARK OFFICE
CERTIFICATE OF CORRECTION

| | | |
|---|---|---|
| PATENT NO. | : 7,065,556 B1 | Page 1 of 1 |
| APPLICATION NO. | : 09/661360 | |
| DATED | : June 20, 2006 | |
| INVENTOR(S) | : James P. Hickey et al. | |

It is certified that error appears in the above-identified patent and that said Letters Patent is hereby corrected as shown below:

In column 3, line 11, after "had" insert -- registered --.

In column 8, line 13, in Claim 16, after "computers" insert -- or --.

In column 8, line 24, in Claim 16, after "registering" delete "said".

Signed and Sealed this

Eleventh Day of August, 2009

David J. Kappos
*Director of the United States Patent and Trademark Office*